United States Patent [19] [11] Patent Number: 4,997,694
Legare [45] Date of Patent: Mar. 5, 1991

[54] CELLULAR CERAMIC AND FOAM MATERIALS

[76] Inventor: David J. Legare, 11 Bonnie Ave., New Hartford, N.Y. 13413

[21] Appl. No.: 405,330

[22] Filed: Sep. 11, 1989

Related U.S. Application Data

[63] Continuation-in-part of Ser. No. 97,707, Sep. 17, 1987, Pat. No. 4,871,694, which is a continuation-in-part of Ser. No. 840,071, Mar. 17, 1986, abandoned.

[51] Int. Cl.⁵ .............................................. B32B 3/26
[52] U.S. Cl. ................................... 428/71; 428/304.4; 428/305.5; 428/312.6; 428/312.8; 501/39
[58] Field of Search ................... 428/71, 304.4, 305.5, 428/312.2, 312.6, 312.8, 913; 501/39

[56] References Cited

U.S. PATENT DOCUMENTS 4,871,694 10/1989 Legare .................................. 501/39

Primary Examiner—William J. Van Balen
Attorney, Agent, or Firm—Charles S. McGuire

[57] ABSTRACT

Methods of forming by polymerization reaction a silicate gel which exhibits intumescence upon application of heat and various products formed from the resulting ceramic foam materials. Specific formulations and processing steps best suited to particular applications are set forth, together with examples of various types and configurations of the resulting products. These include structural materials, such as sheets of wall board, very low density insulation materials, articles useful as a protective barrier from heat or flame, vitreous materials useful as heat resistant tiles or as abrasive wheels or blocks for grinding or polishing, and ceramic foam materials incorporating silica gel and processed solely with microwave heat.

41 Claims, 1 Drawing Sheet

CELLULAR CERAMIC AND FOAM MATERIALS

REFERENCE TO RELATED APPLICATIONS

This is a continuation-in-part of copending application Ser. No. 97,707, filed Sept. 17, 1987, now U.S. Pat. No. 4,871,694, which was a continuation-in-part of application Ser. No. 840,071, filed Mar. 17, 1986, now abandoned.

BACKGROUND OF THE INVENTION

The above-referenced parent patent, which is incorporated herein by reference, discloses and claims a method of forming a silicate gel by polymerization reaction which exhibits intumescence upon application of heat. The present application relates to more specific applications of this method and to the fabrication of products or materials produced thereby.

The parent patent discusses various prior art processes and materials involving the hardening of aqueous alkali metal silicate compositions to form a gel or solid product, and the distinctions and advantages of the method of the parent patent. It has been found through further experimentation that certain, more specific parameters within the scope of the method more generally disclosed and claimed in the parent patent provide enhanced properties of the end products, especially as employed in particular applications. Also, further useful products and applications utilizing such methods have been devised, and are disclosed herein.

Accordingly, it is a principal object of the present invention to provide useful articles and materials comprising silicate gels formed by polymerization reaction, and novel methods for the production of such articles.

More specific objects within the scope of the foregoing are to provide:

1. structural materials, e.g., sheets suitable for use as wall board, having mechanical properties similar to conventional gypsum board, but of lower density, higher strength and higher degree of fire protection;

2. very low density ceramic foam materials for use in sheets or blocks as bulk insulation in construction applications;

3. a fireproof article including an encapsulated gel material between a pair of liners or substrates useful as a protective barrier layer in packaging and building systems;

4. a vitreous material produced by heating the intumesced ceramic foam to a temperature at which it begins to soften or melt; and 5. ceramic foam materials using silicic acid (silica gel) as a principal additive ingredient and intumesced with microwave heat.

Other objects will in part be obvious and will in part appear hereinafter.

SUMMARY OF THE INVENTION

In all embodiments, the invention employs the methods described more generally in the aforementioned parent patent. That is, a silicate gel which exhibits intumescence upon heating is formed by polymerization reaction by adding an alkali metal chloride, bromide, iodide or nitrate to an aqueous solution of sodium or potassium silicate. The embodiments disclosed herein represent further refinements of the basic methodology and materials produced thereby which are embodied in the parent patent.

A first aspect of the present invention relates to an optimum material composition for use as wall board, or in similar applications where a relatively high melting point is desired for fire protection. Calcium carbonate powder is thoroughly mixed with an aqueous solution of sodium or potassium silicate to form a slurry. Sodium or potassium chloride is then quickly and thoroughly mixed into the slurry to form a gel which is pressed into sheets or formed in other desired shapes. The gel is then heated by a thermal source at about 1,000° to 1,200° F. to cause intumescense and the formation of a rigid, light weight, cellular, ceramic product with a melting point as high as about 2,300° F., depending on the calcium carbonate content. It should be noted that some combination of thermal and microwave heating may also be used to cause intumescence.

A second disclosed embodiment concerns a product of very low density ceramic foam which can be used in sheets or blocks as bulk insulation in building construction and other applications. Potassium or sodium nitrate is mixed into an aqueous solution of sodium and/or potassium silicate solution to form a gel. It should be noted that potassium nitrate is preferable when the silicate solution is primarily sodium silicate. The gel is pressed into sheets or other desired shapes and heated at a temperature of about 500 to 1,100° F. to cause intumescence. A more uniform foam product may result from adding relatively small amounts of sodium and/or potassium sulfate or phosphate to the silicate solution prior to the addition of the potassium or sodium nitrate. Also, fiber or mesh fillers may be used to affect the final material composition and properties, if desired.

A third aspect of the invention involves the use of the material in the gel state to serve as a protective, heat and flame resistant barrier layer in packaging and building applications. The gel is formed by mixing an alkali metal halide or nitrate with a sodium or potassium silicate solution, as previously described. The water content of the gel is maximized in order to optimize heat protection. The gel may be sandwiched between layers of waterproof cardboard, and/or encapsulated by a thin, flexible, plastic membrane. Upon exposure to heat, the gel layer intumesces, absorbing and dissipating large quantities of heat through the production and release of steam. The resulting expanded ceramic foam layer continues to protect the underlying material because of its intrinsic flame resistance, reflectivity and extremely low thermal conductivity.

Another aspect of the invention provides an essentially vitreous, intumesced ceramic foam product. Certain of the ceramic foam compositions of the parent patent may be subjected to an additional heating step in which the material is raised to a temperature at which it begins to soften or melt. This results in a partial collapse and shrinkage of the foam structure as the foam cells begin to fuse together, producing a material which is usually much harder than the starting ceramic, while retaining a porous, foam-like structure, provided it is not heated to the point of complete melting.

In still another application, a material useful as wall board or ceiling tile products is formed by mixing silicic acid (silica gel), preferably at least partially hydrated, into a sodium and/or potassium silicate solution to form a slurry. The polymerized gel is formed by adding the aforementioned gelling salt agent(s), (preferably sodium or potassium chloride). The gel thus formed can be completely processed into a very useful ceramic foam using only microwave heating.

DETAILED DESCRIPTION

Figure 1:
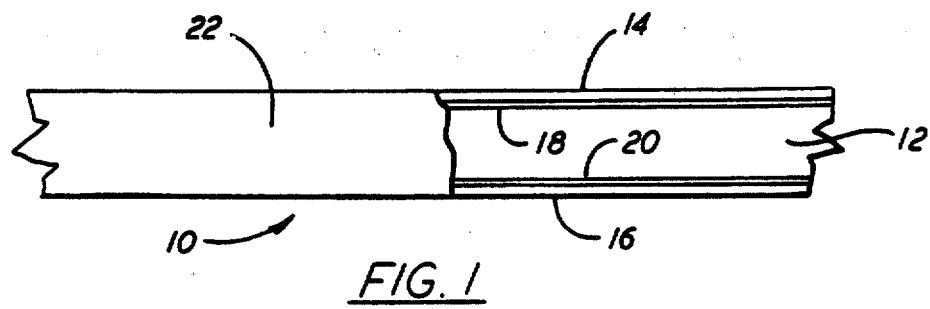
FIG. 1 is a diagrammatic, perspective view of a product exemplifying one aspect of the invention.

All aspects or embodiments of the present invention include forming by polymerization reaction a silicate gel which exhibits intumescence upon application of heat by adding at least one alkali metal chloride, bromide, iodide or nitrate to an aqueous solution of sodium or potassium silicate, as taught in the parent patent. The resulting gel may be molded, pressed, or extruded into flat sheets and may, if desired, be applied and bonded to a substrate layer either in the gel state or after heating to form a cellular ceramic product. However, if the gel is first applied to a substrate, and it is desired to further heat-process the gel to form an intumesced cellular ceramic product, the substrate should be composed of materials which are not destroyed by the heating process.

One aspect of the present invention consists of a potentially very high temperature (high melting point) material which can be manufactured as a wall board product with properties similar to conventional gypsum board (e.g., can be nailed to structural members of walls, floors or ceilings), but of lower density, higher strength and providing a greater degree of fire protection than ordinary gypsum board. The preferred composition and method of production of this "wall board" material is as follows:

1. To 20 parts of a 10% to 40% (by weight) aqueous solution of sodium or potassium silicate containing a soluble $SiO_2$ to metal oxide ratio between about 1:1 and 5:1, thoroughly mix in about 1 to 10 parts calcium carbonate powder to form a slurry. The sodium or potassium silicate solution should also preferably contain a certain amount of insoluble $SiO_2$ such as is found in various commercial compositions of water glass (sodium silicate solution). e.g., soluble $SiO_2:Na_2O$ ratio of about 3.4:1 and colloidal $SiO_2$ to soluble silicate ratio of around 2:1.

2. Add about 2 to 8 parts sodium or potassium chloride (powder or fine granules) to the above slurry, and quickly and thoroughly mix/blend in to form a gel.

3. Press, mold or extrude the gel into relatively thin sheets (e.g., ¼ to ½ inch or less, for wall board, etc. A layer of heat-tolerant material such as aluminum foil may be applied to the gel sheets. This layer will normally bond to the sheet as it is transformed into the cellular ceramic state.

4. Heat the gel at around 1000° F. to 1200° F. for a time sufficient to cause intumescence and the formation of a rigid, light weight, cellular, ceramic product.

5. Optionally, apply to one or both sides of the cellular ceramic sheet a layer of paper or paperboard of the same length and width. A viscous solution of sodium silicate is one type of adhesive that may be used for this purpose.

This material composition can be made to have a relatively high melting point (as high as about 2300° F.) by increasing the amount of calcium carbonate ($CaCO_3$) in the mixture. Other components such as magnesium carbonate and magnesium silicate (talc) can be added with the calcium carbonate to vary the material properties without degrading its high temperature characteristics. However, the use of calcium carbonate as the major or only additive component, as specified above, provides a superior wall board product, both in terms of its low material cost, and because of the good mechanical properties of the resulting ceramic product. Examples of some experimental compositions and their melting points are as follows:

TABLE I

| Commercial Sodium Silicate solution (approx. 32% by weight) | NaCl | $CaCO_3$ | $MgCO_3$ | Talc | Melting pt. (degrees F) |
|---|---|---|---|---|---|
| (1) 20 g | 4 g | 2 g | — | — | 1250 |
| (2) 20 g | 4 g | 4 g | — | — | 1650 |
| (3) 20 g | 4 g | 8 g | — | — | 2250 |
| (4) 20 g | 6 g | 2 g | — | — | 1250 |
| (5) 20 g | 6 g | 4 g | — | — | 1650 |
| (6) 20 g | 6 g | 8 g | — | — | 2250 |
| (7) 20 g | 4 g | 6 g | 3 g | — | 2000 |
| (8) 20 g | 4 g | 6 g | — | 3 g | 2000 |

The preferred components and range of proportions thereof in forming the wall board product of the invention are: 20 parts commercial (25% to 40% by weight) sodium silicate solution having a soluble $SiO_2:Na_2O$ ratio of about 3.4:1 and colloidal $SiO_2$ to soluble silicate ratio of about 2:1; 3 to 6 parts (by weight) NaCl and/or KCl; 2 to 8 parts (by weight) $CaCO_3$.

Another aspect of the present invention concerns a very low density ceramic foam, and method of production thereof, which can be used as a bulk insulation in home and building construction applications. As such, this material could substitute for fiberglass, urethane foam, and particle fillers for the insulation of walls and ceilings. This ceramic foam could be formed as sheets up to several inches thick through heating of a single gel layer or the combination of two or more foamed (intumesced) gel layers to form a sufficiently thick ceramic foam insulation layer. The preferred composition and method of forming the product of this aspect of the invention is as follows:

1. To 20 parts of a 10% to 40% (by weight) solution of sodium and/or potassium silicate (preferably sodium silicate) with soluble $SiO_2$ to alkali metal oxide ratio of about 2:1 to 5:1, mix/blend in 2 to 8 parts potassium or sodium nitrate (preferably potassium nitrate) to form a gel.

1a. Optionally, add up to 2 parts sodium and/or potassium sulfate or phosphate, and/or up to 5 parts fiber or mesh fillers (e.g., glass fibers).

2. Mold the gel into a desired shape or form into sheets.

3. Heat the gel at a temperature of about 500° F. to 1100° F. to cause intumescence. The heating process should be carefully controlled to prevent large bubbles from forming in the foam. A more uniform foam product may result from first adding small amounts of sodium and/or potassium sulfate and/or phosphate to the solution in Step 1 (above). Some microwave heating may also be used in combination with the thermal heating to provide a more uniform foam structure.

4. The resulting ceramic foam may be cut and/or laminated, or combined in multiple layers, to suit specific applications. For example, foam sheets may easily be cut to fit between wall studs, and could be laminated with common materials such as aluminized paper to provide a vapor barrier such as is commonly found in fiberglass wall insulation products. It should be noted that in order to facilitate the production of foam sheets of sufficient thickness to fully fill the entire wall space (4 inches or more), it may be desireable to process two or more individual foam sheets and layer them together to form a single sheet of the required thickness.

The preferred components and range of proportions thereof in forming the ceramic foam insulating product of the invention are: 20 parts commercial (25% to 40% by weight) sodium silicate solution having a soluble $SiO_2:Na_2O$ ratio of about 3.4:1 and colloidal $SiO_2$ to soluble silicate ratio of about 2:1; 4 parts $KNO_3$. Also, as mentioned under step 1a above, depending upon the desired properties of the end product, the composition may include 0 to 2 parts sodium and/or potassium sulfate or phosphate, and 0 to 2 parts glass fibers, or other fiber or mesh fillers.

A third aspect of the invention involves a variety of fireproof or fire-retardant packaging or building materials incorporating a gel composition of the type generally disclosed in the parent patent, including specific, preferred variants thereof. Products of this type may be fabricated by placing a layer of the gel between two substrate layers of cardboard, or the like, without first exposing the gel to heat to initiate intumescence. The resulting laminar structure is used to construct containers for flammable articles or other materials requiring protection from fire and/or heat. Alternatively, the laminar structure may be incorporated in building constructions in protective relation to flammable or heat-sensitive portions thereof.

When the gel layer is exposed to heat or flame, intumescence occurs, as previously described, with consequent absorption and dissipation of heat through the production and release of steam in formation of a ceramic foam layer. The resulting expanded foam layer continues to protect materials on the opposite side from heat and flame by virtue of its intrinsic flame resistance, reflectivity and extremely low thermal conductivity. Thus, the contents of packaging materials constructed from the laminar structures, or building members covered or enclosed thereby are afforded a great deal of protection from fire and heat damage. Experimentation has shown that useful gel layer thicknesses can range from as little as about 1 millimeter to a centimeter or more.

In order to provide optimum heat protection the gel composition should be formulated to maximize its water content. This implies that the use of additive and filler materials should generally be minimized, but only to the extent that the structural integrity of the resulting intumesced ceramic foam is not reduced to the point that the foam does not remain intact and continue to provide heat protection by reflecting radiated heat and minimizing heat conduction to the underlying surface or the inside of the package. Foam strength could be enhanced by the addition of glass, ceramic, or other types of fibers either randomly dispersed or incorporated as a uniform mesh into the gel. This would also help to prevent separation or cracking of the gel layer as the substrate layer(s) is flexed.

The water content of the gel, and therefore its ability to dissipate larger quantities of heat, may be increased by adding any of a number of granular filler materials consisting of hydrated salts such as hydrated magnesium sulfate, lithium chloride, calcium sulfate, etc. which contain high percentages of tightly bound water (large hydration energies). The larger the hydration energy, the greater the amount of heat that must be absorbed to liberate the water. It is important that these materials be added as fillers (after the gel is essentially formed) and not as additives to the slurry (before gel formation) so that they do not dissolve into and react chemically with the silicate solution.

Since it is also possible for the hydrated salt filler to react gradually with the silicate in the gel, it may be desireable to first provide a thin, essentially moisture-impervious coating such as parafin, plastic, etc., over the hydrated salt particles to prevent the salt from dissolving into and/or chemically reacting with the gel. This may be of particular importance if the reaction between the hydrated salt and silicate solution results in the formation of an insoluble silicate, and/or the packaging or building material into which the gel is incorporated is intended to be in service for a long period of time.

Another consideration in the production of these packaging or building materials is the dehydration of the gel with exposure to the open air. Although gel compositions can be optimized to resist dehydration, it is preferable that the gel layer be protected by an additional thin, essentially moisture-impervious layer between the gel and the substrate. (It should also be noted here that compositions using potassium silicate solution may have a greater resistance to dehydration.) For example, in a fire-resistant packaging material the gel could be sandwiched between two layers of cardboard which have a waterproof coating such as plastic or parafin on the surfaces which contact the gel. Alternatively, the gel layer could be segmented into individually encapsulated, waterproof segments.

Referring now to the drawing, in FIG. 1 is shown a laminar structure 10 including gel layer 12 sandwiched between upper and lower substrate layers 14 and 16, respectively, which may be of cardboard, corrugated paperboard, or other conventional materials suited for the intended application of laminar structure 10. Assuming the materials of layers 14 and 16 do not inherently provide moisture protection for gel layer 12, the inner surfaces of both layers 14 and 16 (i.e., the surfaces facing gel layer 12) are covered, coated or otherwise treated with an essentially moisture-impervious material 18 and 20, respectively. In order to protect gel layer 12 from moisture in the surrounding atmosphere, the outer edges of structure 10 may be covered with a further layer of moisture-impervious material 22, a portion of which is shown broken away in FIG. 1.

Figure 2:
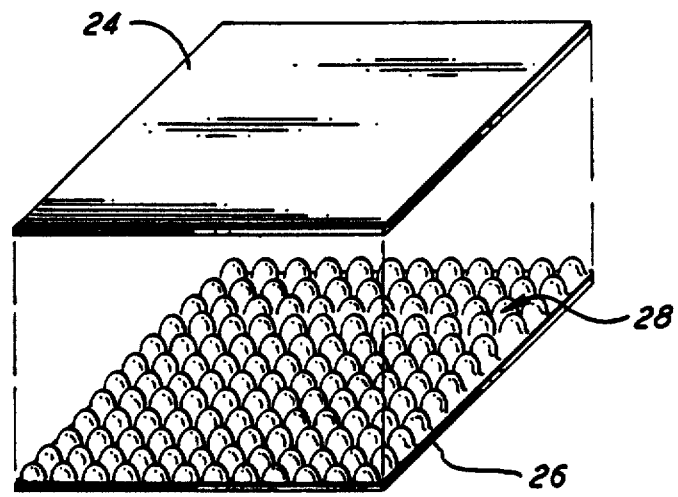
FIG. 2 is a diagrammatic, perspective view of another form of the product of FIG. 1.
Figure 3:
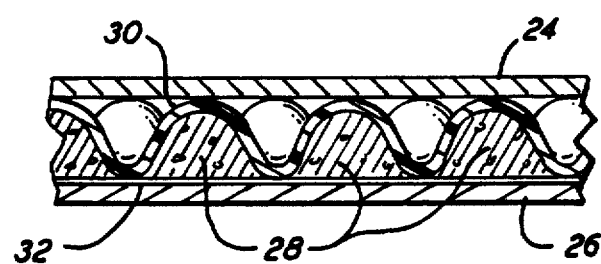
FIG. 3 is an enlarged, fragmentary, elevational view of a portion of FIG. 2.

FIGS. 2 and 3 illustrate diagrammatically a laminar structure including upper and lower substrate layers 24 and 26, corresponding to layers 14 and 16 of FIG. 1, with gel layer 28 therebetween. The gel layer in this embodiment is segregated into individually encapsulated segments by flexible, moisture-impervious material 30, which may comprise a thin plastic sheet, or other suitable material. Material 30 is positioned over gel layer 28 on substrate layer 26 and contacted with a suitable die to be pressed against and bonded to layer 32, of the same or other moisture-impervious material as that of material 30, to form the individual cells or capsules of gel layer 28 which is thus isolated from both layers 24 and 26 as well as the surrounding atmosphere. Upon exposure to heat and flame the outer cardboard layer disintegrates exposing the underlying intumescent gel layer. The plastic membrane covering the gel quickly melts away and the adjacent gel capsules fuse together as they expand during intumescence, therefore providing a continuous protective coating over the inner cardboard layer and package contents.

Although a large number of gel compositions producible under U.S. Pat. No. 4,871,694, could be useful for a number of different heat and/or flame protective applications, the following gel compositions (in parts by weight) would provide a good overall product, particularly for use in packaging materials.

| Sodium and/or Potassium Silicate Solution to 10% to 40% by weight | $KNO_3$, NaCl KCl, (or any combination | Filler (Hydrated Salt Granules e.g., $MgSO_4 \cdot 7H_2O$ | Filler (Fibers or Mesh) e.g. glass fibers |
|---|---|---|---|
| 20 | 2–6 | 0–5 | 0–3 |

Turning now to a further embodiment of the invention, a number of the ceramic foam (intumesced gel) compositions produced by the method of U.S. Pat. No. 4,871,694 can be further processed to form a class of vitreous ceramic foam material's. Not all of the ceramic foam compositions within the scope of the parent patent provide useful results with the further heat processing described herein; however, those that do provide new materials having a number of useful application including low density, heat resistant tiles for structural and/or decorative building materials, and as abrasive wheels or blocks for grinding or polishing. In the latter application, various granular, abrasive materials such as sand, garnet, silicon carbide, etc. are preferably added to the basic gel as filler materials with the fused ceramic foam serving as a matrix for the abrasive particles.

The products of this embodiment are produced by mixing potassium chloride and/or sodium chloride with an aqueous solution of sodium silicate and/or potassium silicate to provide a gel by polymerization reaction; one or more other substances, specified hereinafter, are also mixed into the solution before or together with the alkali metal chloride. The gel is heated until intumescence is substantially complete, forming a cellular ceramic foam material. The intumesced foam is then further heated to a temperature at which it begins to soften or melt. This results in a partial collapse and shrinkage of the foam structure as the foam cells begin to fuse together. It is important to note, however, that the material is not heated to the point that it completely melts, but only to the so-called vitrification temperature.

After cooling, the resultant vitreous material is denser and much harder than the intumesced ceramic foam, but still retains a porous, foam-like structure. Several specific examples of preferred compositions which yield good results in this embodiment of the invention, with approximate vitrification heat processing temperatures for each, are set forth in Table II. The quantities specified are in parts by weight. The sodium silicate solution used was a commercially available product having a soluble $SiO_2:Na_2O$ ratio of about 3.4:1 and a colloidal $SiO_2$ to soluble $SiO_2$ ratio of about 2:1.

TABLE II

| | Sodium Silicate Solution | Bentonite Clay | $MgCo_3$ | $MgSiO_3$ (Talc) | KCl and/or NaCl | $Al_2O_3$ | $Li_3SiO_3$ | LiCl | $CaCO_3$ | Vitrification Temp. °F. |
|---|---|---|---|---|---|---|---|---|---|---|
| 1. | 20 | 8 | — | — | 4 | — | — | — | — | 1400–1500 |
| 2. | 20 | 2 | — | — | 4 | — | — | — | 7 | 2100 |
| 3. | 20 | — | — | — | 3 | — | — | 2 | 6 | 1600–1800 |
| 4. | 20 | — | — | — | 4 | 3 | 3 | — | — | 1400–1500 |
| 5. | 20 | — | — | 12 | 4 | — | — | — | — | 1700–2000 |
| 6. | 20 | — | — | 6 | 5 | — | — | — | — | 1400–1500 |
| 7. | 20 | — | 6 | — | 5 | — | — | — | — | 1400–1500 |

In still another embodiment, the invention concerns a ceramic foam product which can be completely processed using only microwave heating. The materials of this embodiment are characterized by having silicic acid ($H_2SiO_3$), (also known as silica gel) as the major or only additive ingredient. The silicic acid is thoroughly mixed or blended into a sodium and/or potassium silicate solution (10–40% by weight) which has a soluble $SiO_2$ to alkali metal oxide (i.e., $Na_2O$) ratio of about 2:1 to 5:1. This silicate solution is preferably sodium silicate and also preferably contains a colloidal $SiO_2$ to soluble $SiO_2$ ratio of about 1:1 to 3:1 (prior to the addition of the silicic acid). It should be noted that it is desireable to use a hydrated, or at least partially hydrated, form of the silicic acid instead of silicic acid that is in the completely dehydrated state. Furthermore, other additive components such as calcium carbonate and aluminum silicate can be mixed into the slurry to alter the properties of the final ceramic foam product. Formation of the polymerized gel can be accomplished via the addition of any of the gelling salt agents disclosed in U.S. Pat. No. 4,871,694. However, sodium chloride or potassium chloride should preferably be used.

A key feature of this group of materials is that the gel thus formed can be completely processed into a very useful ceramic foam using only microwave heating. As such, the gel is molded into a desired shape or pressed into sheets!, and then heated in a microwave oven until intumescence has been completed. The ceramic foam produced by this invention appears to be particularly useful for the formation of wall-board and ceiling tile products. The preferred chemical composition, in parts by weight, of the gel is as follows:

| Sodium Silicate Soluton (25–40% by weight) | Hydrated Silicic Acid | $CaCO_3$ and/or $Al_2(SiO_3)_3$ | NaCl and/or KCl |
|---|---|---|---|
| 20 | 1.6–5.0 | 0–1.0 | 1.6–4.0 |
| The presently contemplated optimum formulation is: | | | |
| 20 | 2.0–3.0 | .4 | 2.0 |

A preferred sodium silicate to be used in the above compositions is a commercially available product having a soluble $SiO_2:Na_2O$ ratio of about 3.4:1 and a colloidal $SiO_2$ to soluble $SiO_2$ ratio of about 2:1.

What is claimed is:

1. A method of producing sheets of wall board, or similar products, comprising the steps of:
   (a) thoroughly mixing 1 to 10 parts by weight of calcium carbonate powder into 20 parts by weight of a 10% to 40% (by weight) aqueous solution of sodium or potassium silicate having a soluble SiO$_2$ to alkali metal oxide ratio of about 1:1 to 5:1 to form a slurry;

(b) adding about 2 to 8 parts sodium chloride and/or potassium chloride (powder or fine granules) to said slurry, and quickly and thoroughly mixing or blending to provide a gel by polymerization reaction;

(c) forming said gel into sheets of predetermined length, width and thickness; and (d) heating said gel at about 1000° F. to 1200° F. until intumescence is substantially complete to form a rigid, cellular, ceramic product.

2. A sheet of wall board, or the like, produced according to the method of claim 1.

3. The method of claim 1 including the further step of bonding to said sheets of cellular ceramic on at least one major surface thereof a layer of paper or paperboard having said predetermined length and width and a thickness substantially less than said predetermined thickness.

4. The method of claim 1 wherein a sheet of aluminum foil, or other heat-tolerant material is bonded to said gel sheets prior to said heating step.

5. The method of claim 1 including the further step of thoroughly mixing about 3 parts by weight of magnesium carbonate and/or magnesium silicate to said aqueous solution.

6. A sheet of wall board, or the like, produced according to the method of claim 3.

7. A method of producing sheets of wall board, or similar products, comprising the steps of:

(a) thoroughly mixing 2 to 8 parts by weight of calcium carbonate powder into 20 parts by weight of a 10% to 40% (by weight) aqueous solution of sodium or potassium silicate having a soluble SiO$_2$ to alkali metal oxide ratio of about 3.4 to 1 and colloidal SiO$_2$ to soluble silicate ratio of about 2:1;

(b) adding about 3 to 6 parts sodium chloride and/or potassium chloride (powder or fine granules) to said slurry, and quickly and thoroughly mixing or blending to provide a gel by polymerization reaction;

(c) forming said gel into sheets of predetermined length, width and thickness; and (d) heating said gel at about 1000° F. to 1200° F. until intumescence is substantially complete to form a rigid, cellular, ceramic product.

8. A sheet of wall board, or the like, produced according to the method of claim 7.

9. A method of producing a very light weight bulk insulation product, or the like, comprising the steps of:

(a) thoroughly mixing 2 to 8 parts by weight of potassium nitrate or sodium nitrate into 20 parts by weight of a 10% to 40% (by weight) aqueous solution of sodium silicate or potassium silicate having a soluble SiO$_2$ to alkali metal oxide ratio between about 2:1 and 5:1 to provide a gel by polymerization reaction;

(b) forming said gel in sheets or other predetermined shapes;

(c) heating said gel at about 500° F. to 1100° F. until intumescence is substantially complete to form said bulk insulation product.

10. A bulk insulation product, or the like, produced by the method of claim 9.

11. The method of claim 9 including the further step of adding up to 2 parts by weight sodium and/or potassium sulfate and/or phosphate to said aqueous solution prior to formation of said gel.

12. The method of claim 9 wherein said silicate is sodium silicate.

13. The method of claim 12 wherein said nitrate is about 4 parts by weight of potassium nitrate.

14. The method of claim 13 including the further step of adding up to 5 parts by weight of fiber or mesh fillers to said aqueous solution prior to or during formation of said gel.

15. The method of claim 9 wherein a sheet of aluminum foil or similar materials is applied to the gel layer before heating, or to the finished cellular ceramic product.

16. A bulk insulation product, or the like, produced by the method of claim 15.

17. A laminar structure for use as a fire and heat retardant product comprising a first layer of gel which exhibits intumescence upon application of heat formed by polymerization reaction by mixing at least one alkali metal chloride, bromide, iodide or nitrate in an aqueous solution of sodium silicate or potassium silicate sandwiched between second and third, substrate layers, whereby upon exposure of said product to heat or flame said gel layer intumesces with consequent absorption and dissipation of heat through the production and release of steam in transition of said gel layer to a ceramic foam layer.

18. The product of claim 17 wherein said substrate layers are of flammable material.

19. The product of claim 18 and further including an essentially moisture-impervious barrier between said gel layer and each of said substrate layers.

20. The product of claim 18 and further including an essentially moisture-impervious barrier surrounding said gel layer.

21. The product of claim 20 wherein said gel layer comprises a plurality of separately encapsulated portions each surrounded by said moisture-impervious barrier.

22. The product of claim 21 wherein said moisture-impervious barrier comprises a flexible, plastic membrane.

23. The product of claim 17 wherein said gel layer includes particles of at least one hydrated salt comprising up to 20 percent by weight of the total material and other filler materials such as glass or ceramic fibers or mesh comprising up to 12 percent by weight of the total material.

24. The product of claim 23 wherein said hydrated salt particles are added to and dispersed throughout said gel layer during and/or after the gel is essentially formed.

25. The product of claim 23 and further including a layer of essentially moisture-impervious material individually covering each of said salt particles.

26. The product of claim 17 wherein said silicate is potassium silicate.

27. A method of producing a vitreous ceramic foam product comprising the steps of:

(a) thoroughly mixing about 2 to 8 parts by weight sodium chloride and/or potassium chloride, and about 2 to 12 parts by weight of one or more of the class of compositions consisting of Bentonite clay, MgCO$_3$, MgSiO$_3$, Al$_2$O$_3$, Li$_2$SiO$_3$, LiCl, and CaCO$_3$ into 20 parts by weight of a 10% to 40% (by weight) aqueous solution of sodium' silicate and/or potassium silicate having a soluble SiO$_2$ to alkali metal oxide ratio of about 1:1 to 5:1, forming a gel by polymerization reaction;
(b) heating said gel at about 1000° F. to 1200° F. until intumescence is substantially complete, forming a rigid, cellular, ceramic foam product;
(c) heating said foam product to a temperature at or near its melting point until the foam cells begin to fuse together, resulting in partial collapse and shrinkage but short of complete melting of said foam product; and
(d) cooling the resulting vitreous, ceramic product.

28. A vitreous ceramic product produced by the method of claim 27.

29. The method of claim 27 wherein about 3 to 5 parts sodium chloride and/or potassium chloride are mixed into said aqueous solution.

30. The method of claim 27, and further including adding filler materials consisting of particles of an abrasive material to said gel in a quantity which is essentially up to the saturation point of the gel.

31. The method of claim 30 wherein said abrasive material is at least one of sand, garnet and silicon carbide.

32. An abrasive wheel or block for grinding or polishing produced by the method of claim 30, wherein said vitreous, ceramic product serves as a matrix for said abrasive particles 33. A method of producing a cellular, ceramic material comprising the steps of:
(a) thoroughly mixing about 1.6 to 5 parts by weight hydrated silicic acid into 20 parts by weight of a 10% to 40% (by weight) aqueous solution of sodium silicate or potassium silicate having a soluble $SiO_2$ to alkali metal oxide ratio of about 2:1 to 5:1 to form a slurry;
(b) thoroughly mixing about 1.6 to 4 parts by weight of at least one alkali metal chloride, bromide, iodide or nitrate into said slurry, thereby producing by polymerization reaction a gel which exhibits intumescence upon application of heat;
(c) heating said gel via microwave energy (microwave oven) until intumescence is substantially complete.

34. The method of claim 33 and further comprising forming said gel into substantially flat sheets prior to said heating step.

35. A wall board product produced according to the method of claim 34.

36. The method of claim 33 wherein said silicate is sodium silicate.

37. The method of claim 36 wherein said alkali metal chloride, bromide, iodide or nitrate is sodium chloride and/or potassium chloride.

38. The method of claim 37 wherein said aqueous solution has a colloidal $SiO_2$ to soluble $SiO_2$ ratio of about 1:1 to 3:1, prior to the addition of said silicic acid.

39. The method of claim 38 wherein about 2 to 3 parts by weight of said silicic acid and about 2 parts by weight of said sodium chloride and/or potassium chloride are mixed into said aqueous solution to form the gel.

40. The method of claim 39 and further comprising mixing into said slurry up to about 1 part by weight of $CaCO_3$ and/or aluminum silicate.

41. The method of claim 40 wherein about 0.4 parts of $CaCO_3$ are mixed into said slurry.

* * * * *